United States Patent
Havivi et al.

(10) Patent No.: US 8,726,069 B2
(45) Date of Patent: May 13, 2014

(54) HIGHLY AVAILABLE FILE SYSTEM IN A DIRECTLY ATTACHED STORAGE

(75) Inventors: Shahar Havivi, Ramat-Gan (IL); Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 275 days.

(21) Appl. No.: 12/913,348

(22) Filed: Oct. 27, 2010

(65) Prior Publication Data

US 2012/0110370 A1    May 3, 2012

(51) Int. Cl.
*G06F 11/07* (2006.01)

(52) U.S. Cl.
CPC ........ *G06F 11/0706* (2013.01); *G06F 11/0703* (2013.01); *G06F 11/0796* (2013.01); *G06F 11/07* (2013.01)
USPC .......................................... 714/6.1; 714/6.31

(58) Field of Classification Search
CPC . G06F 11/07; G06F 11/0703; G06F 11/0706; G06F 11/0796
USPC ................................. 714/6.1, 6.31
See application file for complete search history.

(56) References Cited

U.S. PATENT DOCUMENTS

| | | | |
|---|---|---|---|
| 2007/0011507 A1* | 1/2007 | Rothman et al. | 714/718 |
| 2007/0299951 A1* | 12/2007 | Krithivas | 709/223 |
| 2008/0244257 A1* | 10/2008 | Vaid et al. | 713/2 |
| 2009/0006827 A1* | 1/2009 | Rothman et al. | 713/1 |
| 2010/0306177 A1* | 12/2010 | Khosravi et al. | 707/674 |
| 2011/0151854 A1* | 6/2011 | Prakash et al. | 455/419 |
| 2011/0161721 A1* | 6/2011 | Fulginiti | 714/2 |
| 2011/0246722 A1* | 10/2011 | Taha et al. | 711/137 |
| 2011/0289146 A1* | 11/2011 | Khosravi et al. | 709/205 |

OTHER PUBLICATIONS

"Intel Active Management Technology (Intel AMT) Quick Reference", 2005, Intel Corporation.*
"Intelligent Platform Management Interface", Printed from the Internet on Oct. 12, 2010 http://en.wikipedia.org/wiki/Intelligent_Platform_Management_Interface, pp. 1-3.

* cited by examiner

*Primary Examiner* — Chae Ko
(74) *Attorney, Agent, or Firm* — Lowenstein Sandler LLP (57) ABSTRACT

A method and system to provide a highly available file system in a directly attached storage (DAS). The storage is directly attached to a computer system that has an inactive operating system. A hardware module in the computer system receives a network command to access the file system. The hardware module determines a physical location of data blocks to be accessed in the storage. According to the network command, the hardware module accesses the data blocks in the storage.

14 Claims, 5 Drawing Sheets

HIGHLY AVAILABLE FILE SYSTEM IN A DIRECTLY ATTACHED STORAGE

TECHNICAL FIELD

Embodiments of the present invention relate to a computer system, and more specifically, to the accessibility of a file system in a directly attached storage (DAS).

BACKGROUND

Directly attached storage (DAS) is a digital data storage system that is directly attached to a computer system (e.g., a storage server) without a storage network in between. A typical DAS system includes one or more data storage devices (e.g., disks) connected directly to a computer through a host bus adapter (HBA). Between the computer and the adapter there is no network device (e.g., hub, switch, or router).

The use of DAS can be a cost effective measure for data storage. In cloud storage where data is stored in multiple networked storage servers, the use of DAS can significantly reduces storage costs.

When a failure occurs in a computer system that is directly connected to a DAS, the DAS often becomes inaccessible. Such failure may occur when the computer system fails to power on (despite being connected to a power source), or the operating system of the computer system fails to boot or otherwise becomes inactive. Without an active and functional operating system, the content of the DAS in the current systems is inaccessible.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing a highly available file system in a directly attached storage (DAS). In one embodiment, the storage is directly attached to a computer system that has an inactive operating system. A hardware module in the computer system receives a network command to access the file system. The network command may be received via a dedicated management channel. The hardware module determines a physical location of data blocks to be accessed in the storage. According to the network command, the hardware module accesses the data blocks in the storage.

According to one embodiment of the invention, the network command may be received via a dedicated management channel through a dedicated port in the hardware module. The dedicated port may have a network address that is different from the network address of the computer system. When the computer system fails to power on (even though it is receiving power), fails to boot its operating system, or the operating system becomes inactive for any other reason, the hardware module can independently function without the operating system. The hardware module can perform a number of power management operations and file system operations according to received network commands. Through the hardware module, a remote system (e.g., a client or a support system controlled by a system administrator) can access the contents of the DAS without a functioning operating system in the computer system. In one embodiment, the hardware module is a basic input/output system (BIOS), also referred to as a "smart BIOS." In an alternative embodiment, the hardware module is a dedicated network card. Other embodiments may exist.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
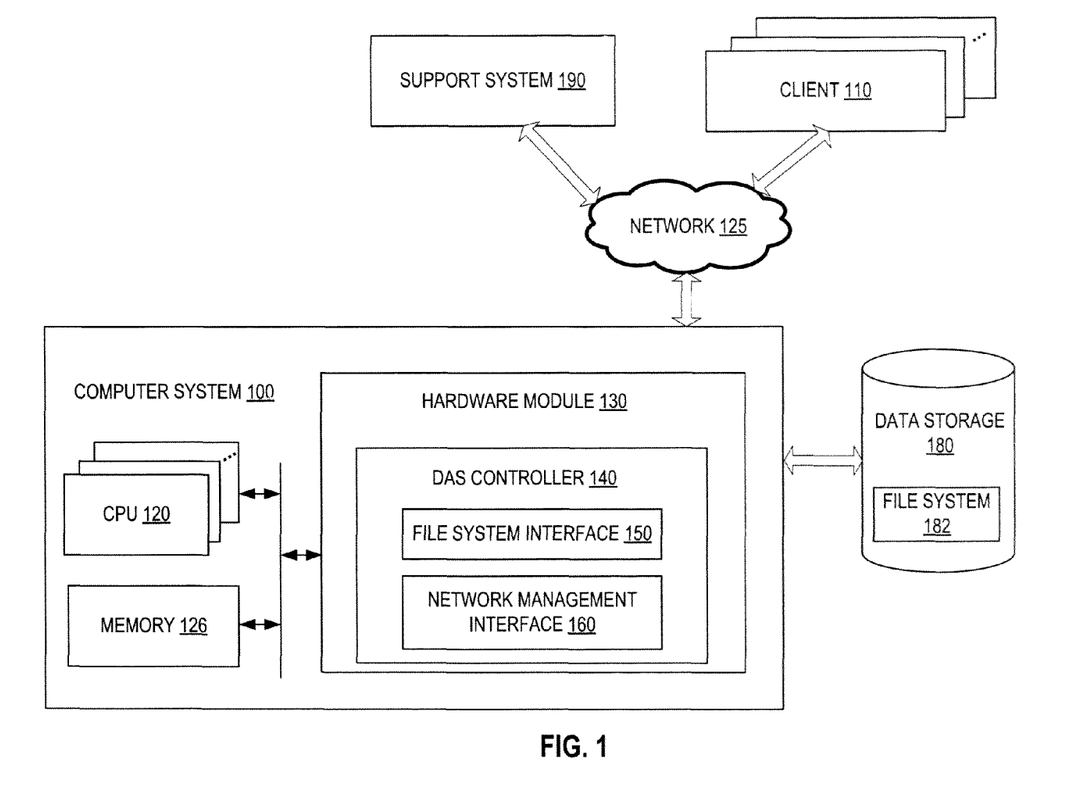
FIG. 1 is a block diagram of one embodiment of a computer system that uses a directly attached storage (DAS).

FIG. 1 is a block diagram that illustrates an embodiment of a computer system 100 coupled to one or more clients 110 via a network 125. The computer system 100 may be a server a workstation, or other computing devices that is capable of functioning as a storage server and managing a directly attached storage (DAS), such as a data storage 180. In one embodiment, the data storage 180 may include mass storage devices, such as magnetic or optical storage based disks, tapes or hard drives. The network 125 may be a private network (e.g., a local area network (LAN), a wide area network (WAN), intranet, etc.) or a public network (e.g., the Internet). Each of the clients 110 may be a computer (e.g., a server, a workstation, a personal computer (PC), a laptop, etc.), a mobile phone, a hand-held computing device, a game station, a personal digital assistant (PDA), etc. The clients 110 may access the content of the data storage 180 through the computer system 100.

In one embodiment, the computer system 100 may also be coupled to a support system 190, which monitors the status of the computer system 100 and sends commands to the computer system 100 as directed by a user (e.g., a system administrator).

In one embodiment, the computer system 100 includes one or more central processing units (CPUs) 120 and memory 126. The computer system 100 manages the access to a file system 182 stored in the data storage 180 through a hardware module 130. The hardware module 130 may be a smart Basic Input/Output System (BIOS), a network card, or any other hardware modules that are capable of receiving network commands through the network 125 and directly communicating with the data storage 180 and do not need a functioning operating system for such communication.

According to one embodiment of the present invention, the hardware module 130 comprises a DAS controller 140 to control access to the file system 182 in case of a failure in the computer system 100. Failure may occur when the computer system 100 fails to power on (even though it is receiving power), fails to boot its operating system, or the operating system becomes inactive for any other reason. In one embodiment, the DAS controller 140 includes a file system interface 150 to perform data access, and a network interface 160 to interact with remote systems (e.g., the clients 110, the support system 190, etc.) through the network 125.

Figure 2:
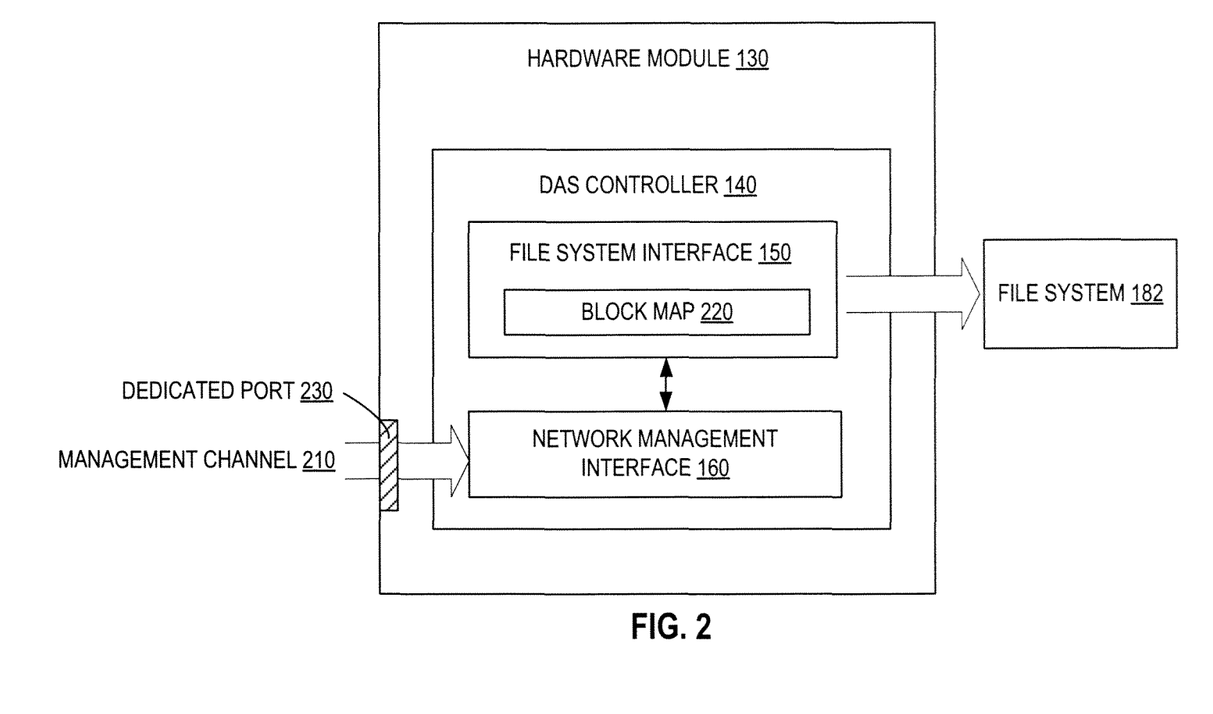
FIG. 2 is a block diagram of one embodiment of a hardware module coupled to a file system stored in the DAS.

FIG. 2 is a block diagram that illustrates an embodiment of the DAS controller 140 within the hardware module 130 in more detail. In this embodiment, the DAS controller 140 uses the network interface 160 to listen to network commands. The network commands may be sent by the support system 190 to a dedicated port 230 of the hardware module 130 via a dedicated management channel 210. The dedicated port 230 has a dedicated network address that is different from the network address of the computer system 100. Thus, when the computer system 100 becomes faulty and the file system 182 cannot be accessed via the normal operating system, an administrator is able to reach the file system 182 via an alternative network address (e.g., the dedicated network address) with standard network protocols such as TELNET, Secure Shell (SSH), etc. Through the hardware module 130, an administrator can perform the following tasks, such as: enumerate the file system 182 on the computer system 100, mount a specified partition (and lock the file system 182), run a disk utility (e.g., fsck diskcheck, spinrite, etc.), to check and repair the existing fault, and execute other file system commands, such as: list files in a directory ("list"), change directory ("cd"), open/close files, read/write files, etc. In one embodiment, upon receiving a network command from the system administrator, the hardware module 130 can also perform power management tasks, such as: power on/off, restart, status queries (e.g., whether the power is on or off), etc.

When the hardware module 130 receives a file system command via the dedicated management channel 210, the DAS controller 140 uses the file system interface 150 to identify the location of the directory or file to be accessed. In one embodiment, the file system 182, including its directories and files, is stored in the data storage 180 as a collection of data blocks. In one embodiment, the collection of data blocks may be organized as a tree structure including nodes that point to the data blocks. Each directory and each file is stored in one or more of the data blocks. A block map 220 records the association between a directory/file and its corresponding data blocks. When the DAS controller 140 receives a file system command, the file system interface 150 consults the block map 220 to determine the physical location of the data blocks corresponding to the directory or file to be accessed. In one embodiment, the file system interface 150 is capable of performing block-level data access.

In one embodiment, the file system interface 150 can support major file system formats (e.g., New Technology File System (NTFS) and its extended family), or any existing file system formats.

According to one embodiment of the present invention, the DAS controller 140 can operate on the file system 180 independent of the status of the operating system. If the operation system is inactive, a remote system can still access the data storage 180 through the hardware module 130 and the DAS controller 140. Within the computer system 100, the DAS controller 140 may reside in any hardware module 130 that has a dedicated network access port and channel.

Figure 3:
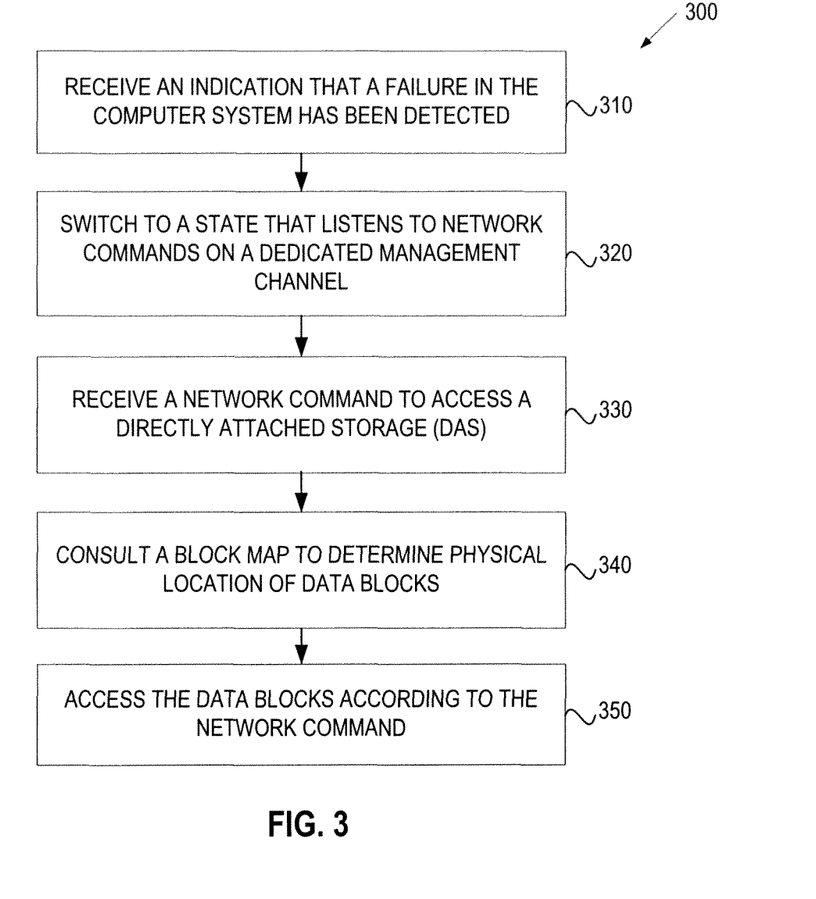
FIG. 3 is a flow diagram of one embodiment of a method for providing access to the DAS.

FIG. 3 is a flow diagram illustrating one embodiment of a method 300 for accessing a file system through a computer system that has a directly attached storage and does not have an active operating system. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the DAS controller 140 of FIG. 1 and FIG. 2 that resides in the hardware module 130 of the computer system 100. In this embodiment, the hardware module 130 may be the BIOS of the computer system 100.

Referring to FIG. 3, in one embodiment, the method 300 begins when the DAS controller 140 receives an indication that a failure of the computer system 100 has been detected (block 310). The failure may be detected by the system administrator or an external software system that monitors signs of failure causing the operating system to be unable to boot or otherwise be inactive. The DAS controller 140 then switches to a state that listens to network commands on the dedicated management channel 210 (block 320). When the DAS controller 140 receives a network command that is a file system command (block 330), the DAS controller 140 consults the block map 220 to determine the physical location of the data blocks to be accessed (block 340). The DAS controller 140 then accesses the data blocks according to the network command (block 350). If the network command requests data to be retrieved from the data storage 180, the DAS controller 140 retrieves the requested data and sends it back to the requestor (e.g., the clients 110 or the support system 190).

Figure 4:
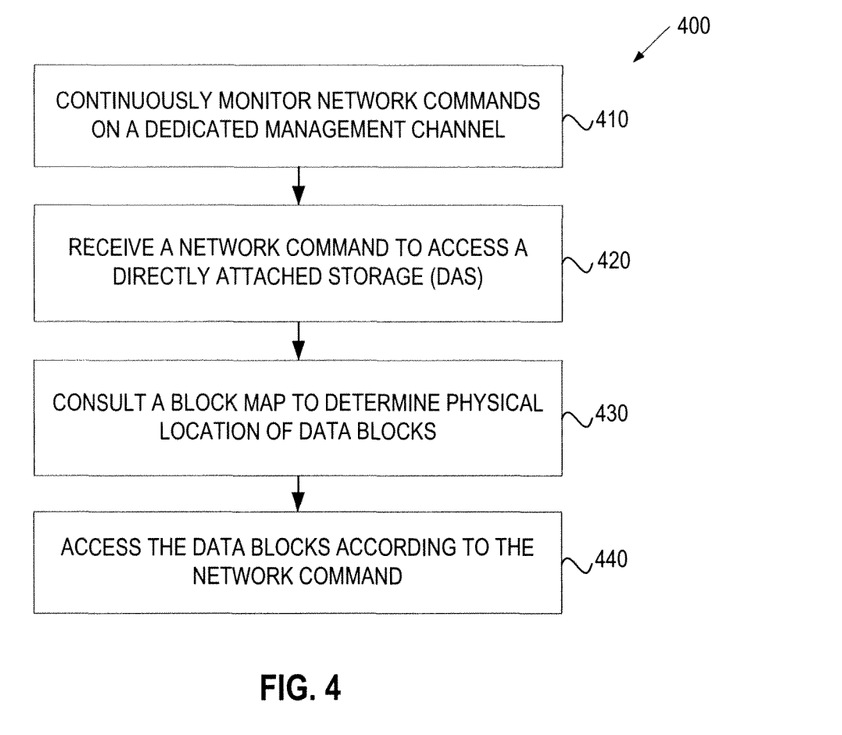
FIG. 4 is a flow diagram of another embodiment of a method for providing access to the DAS.

FIG. 4 is a flow diagram illustrating another embodiment of a method 400 for accessing a file system through a computer system that has a directly attached storage and does not have an active operating system. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the DAS controller 140 of FIG. 1 and FIG. 2 that resides in the hardware module 130 of the computer system 100. In this embodiment, the hardware module 130 may be a dedicated network card in the computer system 100.

Referring to FIG. 4, in one embodiment, the method 400 begins when the DAS controller 140 is enabled to continuously monitor network commands on the dedicated management channel 210 (block 410). The DAS controller 140 may be enabled when the network card in which the DAS controller 140 resides is reset or otherwise becomes active. When the DAS controller 140 receives a network command that is a file system command (block 420), the DAS controller 140 consults the block map 220 to determine the physical location of the data blocks to be accessed (block 430). The DAS controller 140 then accesses the data blocks according to the network command (block 440). If the network command requests data to be retrieved from the data storage 180, the DAS controller 140 retrieves the requested data and sends it back to the requestor (e.g., the clients 110 or the support system 190).

Figure 5:
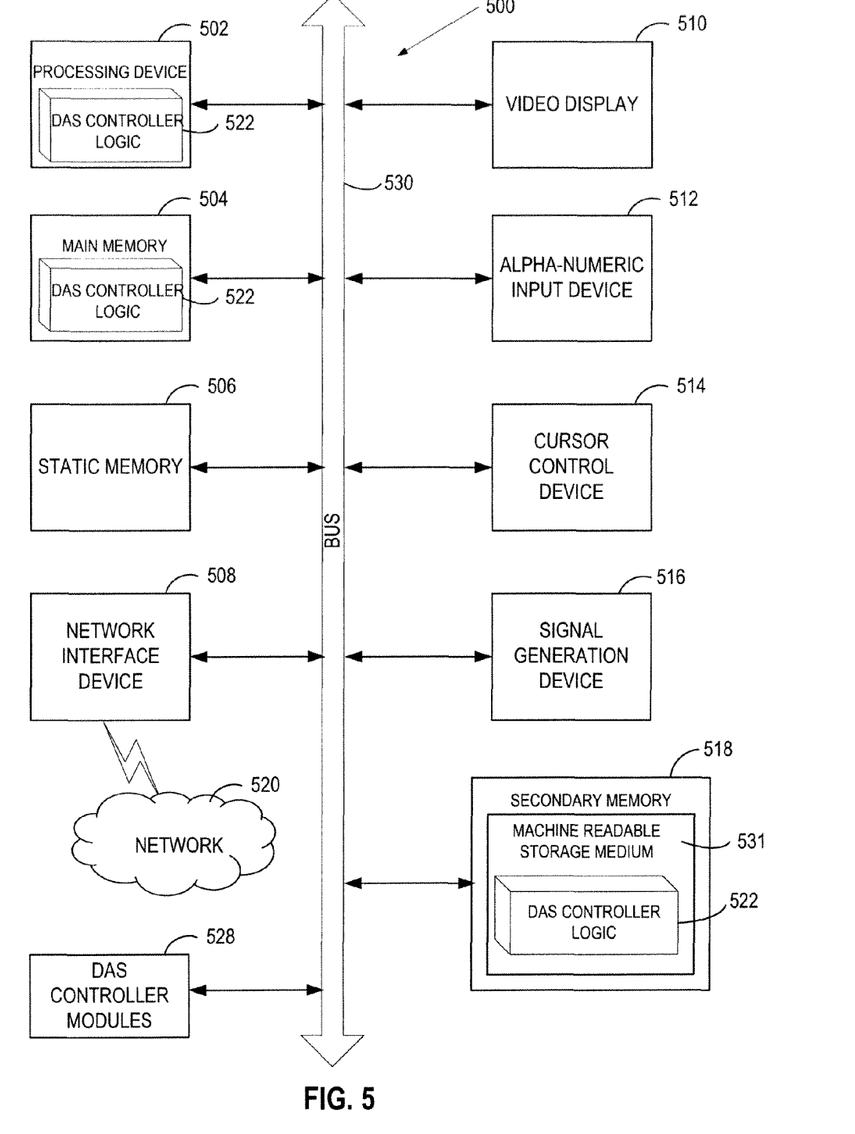
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute DAS controller logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., DAS controller logic 522) embodying any one or more of the methodologies or functions described herein (e.g., the DAS controller 140 of FIGS. 1 and 2). The DAS controller logic 522 may also reside, completely or at least partially, within the main memory 504 and/or within the processing device 502 during execution thereof by the computer system 500; the main memory 504 and the processing device 502 also constituting machine-readable storage media. The DAS controller logic 522 may further be transmitted or received over a network 520 via the network interface device 508.

The machine-readable storage medium 531 may also be used to store the DAS controller logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include DAS controller modules 528 for implementing the functionalities of the DAS controller 140 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices.

Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "accessing", "monitoring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
   receiving, by a hardware module in the computer system, an indication of failure of the computer system, the hardware module capable of accessing a file system independent from an operating system of the computer system, the file system stored in a data storage directly attached to the computer system;
   in response to receiving the indication of failure of the computer system, switching to a state that listens to file access commands on a dedicated channel coupled to the hardware module, the hardware module being a basic input/output system (BIOS);
   receiving, by the BIOS via the dedicated channel, a file access command to access the file system in the data storage directly attached to the computer system, wherein the operating system of the computer system is inactive;
   determining, by the BIOS, a physical location of data blocks to be accessed in the data storage according to the file access command received via the dedicated channel; and
   accessing, by the BIOS, the data blocks in the data storage according to the file access command received via the dedicated channel.

2. The method of claim 1, further comprising:
   continuously monitoring, by the hardware module, file access commands on the dedicated channel that connects to the hardware module.

3. The method of claim 1, wherein the BIOS is to receive the file access command via the dedicated channel using a dedicated port that has a network address different from a network address of the computer system.

4. The method of claim 1, further comprising:
   performing, by the hardware module, power management operations.

5. The method of claim 1, wherein the hardware module performs one or more of the following operations according to the file access command: enumerate the file system, mount a partition and lock the file system, run a disk utility to check and repair a problem in the computer system.

6. A system comprising:
   data storage to store a file system;
   a computer system to which the data storage is directly attached, the computer system has an inactive operating system, the computer system comprises a hardware module capable of accessing the file system independent from the operating system of the computer system, the hardware module being a basic input/output system (BIOS), the BIOS to:
   receive an indication of failure of the computer system;
   switch to a state that listens to file access commands on a dedicated channel coupled to the hardware module;
   receive, via the dedicated channel, a file access command to access the file system in the data storage;
   determine a physical location of data blocks to be accessed in the data storage according to the file access command received via the dedicated channel; and
   access the data blocks in the data storage according to the file access command received via the dedicated channel.

7. The system of claim 6, wherein the hardware module comprises a dedicated port that has a network address different from the network address of the computer system.

8. The system of claim 6, wherein the BIOS is to receive the file access command via the dedicated channel using a dedicated port that has a network acddress different from a network address of the computer system.

9. The system of claim 6, wherein the hardware module performs power management operations according to file access commands.

10. A non-transitory computer readable storage medium including instructions that, when executed by a computer system, cause the computer system to perform a method comprising:
    receiving, by a hardware module in the computer system, an indication of failure of the computer system, the hardware module capable of accessing a file system independent from an operating system of the computer system, the file system stored in a data storage directly attached to the computer system;
    in response to receiving the indication of failure of the computer system, switching to a state that listens to file access commands on a dedicated channel coupled to the hardware module, the hardware module being a basic input/output system (BIOS);
    receiving, by the BIOS via the dedicated channel, a file access command to access the file system in the data storage directly attached to the computer system, wherein the operating system of the computer system is inactive;
    determining, by the BIOS, a physical location of data blocks to be accessed in the data storage according to the file access command received via the dedicated channel; and
    accessing, by the BIOS, the data blocks in the data storage according to the file access command received via the dedicated channel.

11. The computer readable storage medium of claim 10, further comprising:
    continuously monitoring, by the hardware module, file access commands on the dedicated channel that connects to the hardware module.

12. The computer readable storage medium of claim 10, wherein the BIOS is to receive the file access command via the dedicated channel using a dedicated port that has a network address different from a network address of the computer system.

13. The computer readable storage medium of claim 10, further comprising:
    performing, by the hardware module, power management operations.

14. The computer readable storage medium of claim 10, wherein the hardware module performs one or more of the following operations according to the file access command: enumerate the file system, mount a partition and lock the file system, run a disk utility to check and repair a problem in the computer system.

* * * * *

UNITED STATES PATENT AND TRADEMARK OFFICE
CERTIFICATE OF CORRECTION

PATENT NO. : 8,726,069 B2
APPLICATION NO. : 12/913348
DATED : May 13, 2014
INVENTOR(S) : Shahar Havivi and Amos Benari It is certified that error appears in the above-identified patent and that said Letters Patent is hereby corrected as shown below:

In the Claims

Claim 8, column 8, line 13, delete "acddress" and insert --address--

Signed and Sealed this
Fourth Day of November, 2014

Michelle K. Lee
*Deputy Director of the United States Patent and Trademark Office*